United States Patent [19]

Vitzthum et al.

[11] Patent Number: 5,225,223
[45] Date of Patent: Jul. 6, 1993

[54] PROCESS FOR THE PREPARATION OF SOLUBLE COFFEE

[75] Inventors: Otto G. Vitzthum; Klaus D. Koch, both of Bremen, Fed. Rep. of Germany

[73] Assignee: Jacobs Suchard AG, Zurich, Switzerland

[21] Appl. No.: 801,314

[22] Filed: Dec. 2, 1991

[51] Int. Cl.$^5$ .............................................. A23F 5/26
[52] U.S. Cl. ................................... 426/386; 426/434; 426/594; 426/387; 426/432
[58] Field of Search ................ 426/434, 594, 386, 387, 426/432

[56] References Cited

U.S. PATENT DOCUMENTS

| | | |
|---|---|---|
| 3,700,463 | 10/1972 | Bolt et al. . |
| 3,944,677 | 3/1976 | Katz . |
| 4,379,172 | 4/1983 | Liu .................... 426/434 X |
| 4,534,985 | 8/1985 | Gasau ................... 426/434 X |
| 4,673,580 | 6/1987 | Matsuda et al. ............ 426/434 X |
| 4,707,368 | 11/1987 | Vogel et al. ............... 426/434 X |
| 4,798,730 | 1/1989 | Scoville et al. . |

FOREIGN PATENT DOCUMENTS

| | | |
|---|---|---|
| 965638 | 4/1975 | Canada . |
| 1038229 | 9/1978 | Canada . |
| 0097466 | 1/1984 | European Pat. Off. . |

Primary Examiner—Joseph Golian
Attorney, Agent, or Firm—Thomas A. Marcoux; Linn I. Grim; Thomas R. Savoie

[57] ABSTRACT

The invention relates to a process for preparing soluble coffee with an infusion quality similar to that of roast bean coffee, with which instant-typical off-flavour characters are no longer detectable, with which ground roast coffee of a particle size of at most approximately 1.8 mm is treated in a percolator with saturated steam in order to separate essential aroma constituents and the separated aroma constituents obtained as condensate, the remaining roast coffee is subjected at high pressure with extraction water to a primary extraction with the aid of at least 2 percolators, the portion evaporated through pressure-relief is condensed and obtained as further aroma condensate, and the non-evaporated portion placed in interim storage as primary extract, the remaining roast coffee is then subjected at high pressure and increased temperature to a secondary extraction in at least 2 percolators, the portion of the extract evaporated through pressure-relief is separated and discarded, and the non-evaporated portion obtained as secondary portion and optionally divided into a first portion and a second portion, the remaining roast coffee optionally subjected to a tertiary extraction at high pressure and increased temperatures in at least 2 percolators, the portion evaporated through pressure-relief is discarded and the non-evaporated portion obtained as tertiary extract, the second portion of the secondary extract and the tertiary extract, optionally after being combined, optionally extracted with liquid or supercritical $CO_2$ at a high pressure, the extracted portion discarded and the remaining extract obtained, the various extracts condensed in multi-stage evaporators, combined and mixed with the two aroma condensates, and the finally obtained extract with a solids concentration of approximately 35 to 55% freeze- or spray-dried in the usual way, the percolators used having a length/diameter ratio of approximately 3.2:1 to 0.9:1.

9 Claims, 1 Drawing Sheet

PROCESS FOR THE PREPARATION OF SOLUBLE COFFEE

The invention relates to a process for preparing soluble coffee with an infusion quality similar to that of roast bean coffee, with which instant-typical off-flavour characters are no longer detectable.

The preparation of soluble coffee is described in numerous patents. The aim of the majority of processes quoted is to prepare soluble coffee products with an aroma quality of bean coffee.

Bolt (U.S. Pat. No. 3 700 463) describes a coffee-extraction process with which the pressure, the temperature and the extraction time in the fresh-extraction stage or in the first extraction column are kept within a narrowly defined range in order to obtain a coffee extract with great similarity to a roast-coffee infusion, richness, acidity and aroma characters. A good-quality extract is obtained in the counter-flow process in 4 to 12 extraction columns at a temperature of 71° to 127° C., a pressure of 0.35 to 2.5 bar and with a cycle time of 5 to 45 minutes in the fresh-extraction column. The low pressure is realized only in the fresh-extraction column, in the other extraction columns, which already contain partly extracted coffee, higher pressures (Example 1: 10.5 bar) can be realised. This is a one-stage process, with which an extract of relatively low yield is obtained. The length/diameter ratio of the extraction column is ca. 10:1. Relatively coarsely ground roast coffee is used for the extraction. Steam stripping of the ground, fresh roast coffee is also not described. Admittedly, the temperature, the pressure and the cycle time are described as critical, but only in the fresh-extraction column, not during the whole extraction process.

A multi-stage extraction process is described by Matsuda, Ajinomoto General Foods (EP-A-0 097 466). The secondary extract, which is obtained in the "autoclave extraction stage" is split into two extraction portions; the first extract drawing from the secondary extract contains a relatively low concentration of solids and a flavour quality comparable with that of the primary extract, the second extract drawing from the secondary extract produces a higher solids concentration but a lower flavour quality. The primary extraction takes place in the temperature range of approximately 100° to 145° C., the secondary extraction at approximately 160° to 190° ° C. By splitting the secondary extract, it is intended to improve the taste while maintaining the economic yield. With this process relatively coarsely ground roast coffee is used (see Example 1). Information on the geometry of the percolators is lacking and likewise no information on pressure and cycle time during the extraction is given.

According to a further known process for increasing the solubility of already partly extracted ground roast coffee (U.S. Pat. No. 4,798,730, Scoville), the ground and already partly extracted roast coffee is extracted in a one-stage process with water at a temperature of approximately 193° to 232° C. In order to obtain a high yield of approximately 55 to 68 wt-%, relative to the originally used roast coffee, the residence time of the extract in the extractor is kept considerably lower than that of the ground roast coffee. The relationship between the residence time of the ground roast coffee and that of the extract is described as critical. The residence time of the ground, already partly extracted roast coffee is 30 to 120 minutes in the extractor, while that of the extract is only 7 to 45 minutes. The draw-off factor is at least 6, preferably 8 to 10. Partly extracted ground roast coffee is extracted with water at a temperature of 193° to 232° C. in an extraction column, the length/diameter ratio of which can be 2:1 to 20:1. The weight ratio between extract and originally used roast coffee (draw-off factor) is at least six. The residence time of the partly extracted roast coffee of 30 to 120 minutes is considerably longer than the residence time of the extract of 7 to 45 minutes in the extraction vessel Thanks to these extraction conditions a hydrolysis of the partly extracted roast coffee is achieved and at least 50% of the mannan fraction extracted from the roast coffee. Overall, an extraction of 55 to 8 wt-%, relative to the originally used roast coffee, is achieved. No information on grinding fineness of the roast coffee is given. For this process, pressure is obviously not critical. It is merely stated that, under the prevailing process conditions, the pressure is to be set so that the water does not evaporate.

Vogel (U.S. Pat. No. 4,707,368) describes a process for careful aroma separation, with which, prior to the percolation process, steam stripping is carried out under vacuum conditions and at a maximum of 93° C.

In addition to preparing soluble coffee using multistage extraction, further processes are known for careful aroma separation, for aromatizing soluble coffee, for reducing acids and off-flavour substances and for attaining higher yields.

Thus, Pfluger et al. (Canadian Patent Application 965 638) describe a process for preparing an improved coffee product, with which roast coffee is extracted semicontinuously in percolators in the counter-flow process. The drawn-off extract is divided into two portions, one portion having a higher quality and a higher solids concentration and the second portion a lower solids concentration and a poorer quality. From the second portion, some of the water is evaporated in less than 30 seconds. Subsequently, the concentrated second portion is dried together with the first portion. This process is intended to minimize the occurrence Of Off-flavour substances.

Furthermore, a percolation process is described by Katz (CA-A-1 038 229), with which the percolators display a special geometry (conical percolators; as per Example; height 4.5 m, diameter at the lower part 91 cm and at the head of the percolator 61 cm).

Finally, Katz (U.S. Pat. No. 944 677) describes a percolation process, with which increasingly finely ground roast coffee is used in the direction of the extraction-agent flow. However, the information on the grinding fineness is very imprecise (see Example 1).

The disadvantage common to all of these known processes is that they have not managed to prepare a soluble coffee without instant-typical aroma characters and thus to achieve roast bean coffee quality.

Products of higher yield, which are desired on account of profitability, display, in addition to the instant-typical aroma characters, an off-flavour occurring during the hydrolysis process, so that the quality of the thus prepared soluble coffee is not to be equated with a roast coffee infusion. The known aromatizing processes and processes for removing these aroma faults have likewise enjoyed little success to date.

Admittedly, with the low-yield products a soluble coffee of better quality is obtained, but even with these products a soluble coffee with roast bean coffee flavour was not achieved, because even with these products the instant-typical aroma characters occur. Furthermore, because of the low yield, no economically justifiable process is provided.

The aim of the present invention is thus to make available a process with which a soluble coffee is provided in an economically acceptable yield, with which the original aroma of the starting roast coffee is retained and off-flavour characters arising from the hydrolysis process are no longer present, so that the soluble coffee has a roast bean coffee quality.

This aim is achieved by a process with multi-stage extraction of ground roast coffee and processing of the extract solution, which is characterized in that a) ground roast coffee of a particle size of at most approximately 1.8 mm, which has been moistened to a water content of approximately 4 to 70 wt-%, relative to the ground dr roast coffee, is treated in a percolator with a length/diameter ratio of approximately 3.2;1 to 0.9;1 with saturated steam at a pressure of approximately 0.1 to 1 bar and a temperature of approximately 30° to 100° C. for approximately 2 to 40 minutes, the steam loaded with coffee constituents is condensed at a temperature of approximately 0° to 15° C. to a condensate quantity of approximately 3 to 20 wt-%, relative to the quantity of dry roast coffee used, and the condensate is obtained as aroma "a", b) the coffee remaining from stage a), freed from aroma "a", is subjected with extraction water to a primary extraction in a quantity of approximately 2 to 6 parts by weight per part by weight of dry starting roast coffee, at a temperature of approximately 20° to 150° C. and a pressure of approximately 5 to 100 bar with the aid of at least 2 percolators with a length/diameter ratio of approximately 3.2:1 to 0.9:1 for approximately 2 to 40 minutes per percolator and for an overall time of approximately 10 to 200 minutes, followed by pressure-relief to approximately 0.001 to 1 bar, the evaporated portion obtained by spontaneous partial evaporation of the extract is condensed at a temperature of approximately 0° to 15° C. and the condensate is obtained as aroma "b" and the non-evaporated portion as primary extract, c) the coffee remaining from stage b), freed from aroma "b" and from primary extract, is subjected with extraction water to a secondary extraction in a quantity of approximately 2 to 6 parts by weight per part by weight of dry starting roast coffee at a higher temperature than in stage b) within a range of approximately 100° to 215° C. and at a pressure of approximately 5 to 100 bar with the aid of at least 2 percolators with a length/diameter ratio of approximately 3.2:1 to 0.9:1 for approximately 2 to 40 minutes per percolator and for an overall time of approximately 10 to 200 minutes, followed by pressure-relief to approximately 0.01 to 2 bar, the evaporated portion obtained by spontaneous partial evaporation of the extract is discarded, the non-evaporated portion is obtained as secondary extract, and optionally divided into a first portion of approximately 70% and a second portion of approximately 30%, d) optionally the coffee remaining from stage c), freed from the discarded evaporated portion and from the secondary extract, is subjected with extract water to a tertiary extraction in a quantity of approximately 2 to 6 parts by weight per part by weight of dry starting roast coffee at a higher temperature than in stage c) within a range of approximately 150° to 240° C. and at a pressure of approximately 5 to 100 bar with the aid of at least 2 percolators with a length/diameter ratio of approximately 3.2:1 to 0.9:1 for approximately 2 to 40 minutes per percolator and for an overall time of approximately 8 to 160 minutes, followed by pressure-relief to approximately 0.01 to 5 bar, the evaporated portion obtained by spontaneous partial evaporation of the extract is discarded and the non-evaporated portion is obtained as tertiary extract, e) optionally the second portion of the secondary extract and the tertiary extract, optionally after they have been combined, is extracted, in order to remove off-flavour substances, with liquid or supercritical $CO_2$ at a temperature of approximately 20° to 120° C. and a pressure of approximately 60 to 400 bar and the remaining extract obtained, and f) optionally the second portion of the secondary extract extracted with $CO_2$ and optionally the tertiary extract treated with $CO_2$ are concentrated in a multi-stage evaporator to a solids concentration of approximately 40 to 60%, parallel to this, the primary extract is concentrated in a multi-stage evaporator to a solids concentration of approximately 25 to 40%, and likewise parallel to this, the secondary extract or optionally only the first Portion of the secondary extract is concentrated in a multi-stage evaporator to a solids concentration of approximately 40 to 60%, the concentrated extract solutions are combined and mixed with aromas "a" and "b" and the obtained extract, which has a solids concentration of approximately 35 to 55%, is freeze- or spray-dried in the usual way.

The primary, secondary and tertiary extractions are preferably carried out at a drawing-off ratio of roast coffee input to extraction quantity of 1;2 to 1:6. The cycle time in the individual extraction stages b), c) and d) is preferably 5 to 12 minutes. The pressure in the individual extraction stages b), c) and d) is, in a preferred embodiment, 35 to 60 bar.

Whilst in stage a) only one percolator is usually used, in each of stages b), c) and d) at least 2 percolators, preferably 4 to 7 percolators, are used. The percolators preferably have a length/diameter ratio of 3:1 to 2:1, particularly of approximately 2.5:1.

The process is preferably carried out semi-continuously using — preferably in circular arrangement — 7 to 22 percolators in stages a) to d), with, as already mentioned, only one percolator being provided for stripping stage a) and at least 2 percolators for each of the three other stages b) to d), which are in contact with each other within the individual stages so that the outlet of each percolator is joined to the inlet of the following percolator and the fresh extraction water being introduced into the last percolator in each case with the relatively largely extracted coffee of stages b) to d) and being drawn Off from the first percolator in each case with slightly extracted coffee and the plant being operated with cycle times — identical for all percolators — so that in each cycle time a percolator preceding the stripping percolator of stage a) is filled with fresh, ground roast coffee and the last percolator of stage d) is emptied of completely extracted coffee, whereby stages a) to d) always move on one percolator at a time towards the newly poured, fresh roast coffee.

It is obvious that within the quoted temperature ranges and extraction-time ranges, operations for the individual extraction stages are such that shorter extraction times are used at higher temperatures and longer extraction times at lower temperatures.

Figure 1:
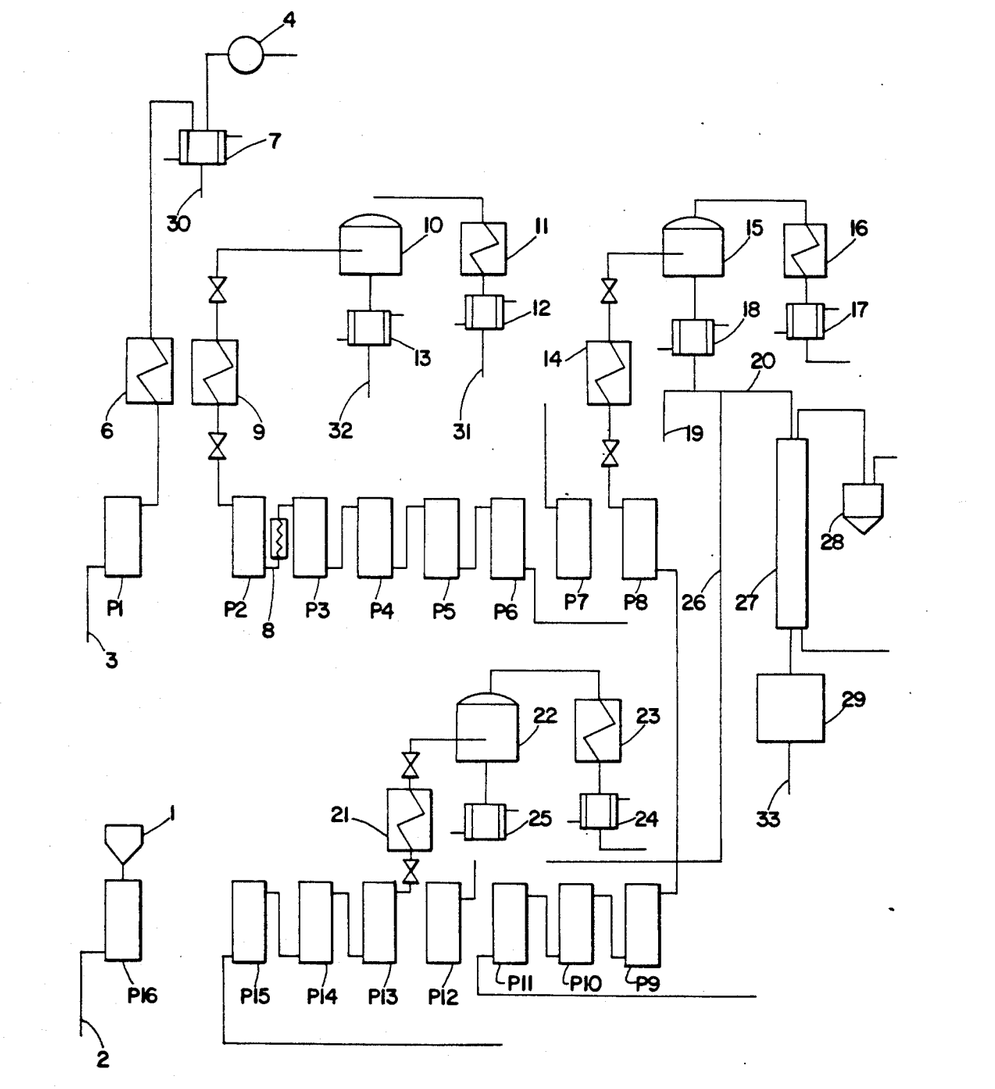
The figure shows a diagrammatic representation of an entire extraction plant with 16 percolators in total.

Freshly ground roast coffee is located in the reserve vessel (1) of percolator (P16). After percolator 16 has been emptied and rinsed, the roast coffee is emptied from the reserve vessel into the percolator. Immediately thereafter the ground roast coffee is moistened via process-water line (2). In the following cycle saturated steam is passed through the pre-moistened roast coffee, now in percolator (P1), via stripping-steam pipe (3).

Steam and stripped aromas are removed with the aid of an aroma-extraction valve (4), condensed in a two-stage plate-cooler (6) and the aroma obtained collected as aroma "a" in a storage tank (7). The process is carried out under vacuum.

In the next cycle, the stripped percolator is connected into the primary extraction stage, comprising percolators (P6) to (P2), and extract from percolators (P6) to (P3) is passed through, followed by extraction. The extract, prior to entry into percolator (P2) is set to a defined temperature by means of an intermediary cooler (8).

The extract is pressure-relieved via a pressure-reducing system (9) directly into a flash evaporator (10). The steam portion and the aromas are condensed in a two-stage cooler (11) and the obtained aroma is stored as aroma "b" in a storage tank (12). The liquid extract portion is pumped out of the flash evaporator (10) and placed in interim storage in a storage tank (13) as primary extract.

The described percolator passes through the primary extraction stages (P2) to (P6) and is then connected into the secondary extraction stage (P11) to (P7). Percolator P7 remains isolated for one cycle length, while it is raised to the temperature level of percolators (P8) to (P11).

In the next cycle, the extract from percolators (P11) to (P9) is passed through percolator (P8), followed by extraction. The extract is pressure-relieved, analogous to the drawing of the primary extract, via a pressure-reducing system (14) directly into a further flash evaporator (15). The steam portion is condensed in a cooler (16) and stored in a container (17). This steam portion is removed from the process and discarded. The liquid extract portion is pumped out of the flash evaporator (15) and placed in interim storage in a storage tank (18) as secondary extract.

Depending on the embodiment, the secondary extract is either Passed without further treatment via pipe (19) to an evaporator not shown, or part of the secondary extract is drawn off via pipe (20) and subjected to a $CO_2$ extraction, which is explained in more detail below.

Percolator (P8) moves through the secondary extraction stage as far as percolator (P11) and is then taken over as percolator (P12) into the tertiary extraction unit (P15) to (P12). Here, it is firstly isolated and raised to the increased temperature level of the tertiary extraction stage. In the next cycle, the extract from percolators (P15) to (P14) is passed through percolator (P13), followed by extraction. The process here is analogous to the previous extraction stages. The extract drawn off from percolator (P13) is pressure-relieved via a pressure-reducing system (21) directly into a third flash evaporator (22), the steam portion being condensed in a cooler (23), collected in a container (24) and subsequently discarded. The liquid extract portion is pumped out of the flash evaporator (22) and placed in interim storage in a storage tank (25) as tertiary extract.

The tertiary extract obtained is drawn off via the pipe (26) and, depending on the embodiment, passed alone or mixed with the second portion of the secondary extract to a $CO_2$ extraction column (27). The extracted Portion is collected in a separator (28) and discarded, whilst the extract freed from the extracted substances is placed in interim storage in a storage tank (29).

The individual extracts in interim storage are then drawn off via the pipes (19, 32 and 33) and individually passed to evaporators, which are not shown in the figure. The condensed extracts are brought together and combined with the aromas "a" and "b" drawn off via the pipes (30 and 31). The combined extract obtained is then freeze- or spray-dried in usual devices, likewise not shown.

Thanks to the process according to the invention it has become possible to prepare a soluble coffee in economically acceptable yield, which displays a roast bean coffee quality and with which the typical off-flavour characters can no longer be detected. First of all it is important that the extraction time of the aroma-carrying fraction is kept very short after the steam distillation of the ground roast coffee in order to obtain the volatile aromas. The particle size of the roast coffee used approaches the grinding fineness usual with vacuum-packed coffee. Normally, percolation processes are carried out with a very large amount of fairly coarsely ground roast coffee. In addition, the number of percolators is doubled to tripled compared with usual percolation processes and their geometry is also changed to a length/diameter ratio of 3:1 to 0.9:1 (usual length/diameter ratios are in the range of 4:1 to 7:1 and even more; see U.S. Pat. No. 4,707,368). It has surprisingly been shown that with these unusually short percolators an aroma distillate can be obtained which can be satisfactorily stored at low temperatures and contains an adequate roast coffee aroma.

Furthermore, it is of essential importance that the extraction takes place under a high pressure of approximately 5 to 100 bar, preferably 40 to 60 bar. In order to obtain the roast coffee quality with an economic degree of extraction, the extraction is carried out in 7 to 22 percolators. These percolators are each allocated to two or three extraction units, depending on the degree of profitability, the first extraction unit supplying the primary extract, the second the secondary extract and the third the tertiary extract. If a profitability of up to ca. 50% extraction is required, relative to the roast coffee, the process can be carried out in two stages, i.e. a primary extraction and a secondary extraction suffice.

If a somewhat higher profitability is to be achieved, the secondary extraction takes place at somewhat higher temperatures within the quoted temperature range, off-flavour substances occurring towards the end of the extraction. It was surprisingly found that these off-flavour substances can be surprisingly readily removed by a supercritical extraction with liquid or compressed gaseous carbonic acid from the aqueous phase. Approximately the first 70% of the secondary extract occurring need not be subjected to this $CO_2$ extraction. They contain practically no off-flavour substances. Only the remaining 30% of the secondary extract need be extracted with $CO_2$, if the secondary extraction is carried out at higher temperatures. With the aid of adsorbents, preferably activated carbons, molecular sieves Or ion-exchanger resins, onto which the off-flavour substances located in the $CO_2$ phase can be adsorbed, the supercritical liquid or compressed gaseous $CO_2$ can be regenerated again and once more used as extraction agent for extracting off-flavour substances from the secondary extract. The surprising result, that the off-flavour substances can be removed by $CO_2$, suggests that they have a lipophilic nature. (Regarding the $CO_2$ extraction reference is made to U.S. patent application Ser. No. 801,156 concurrently filed on Dec. 2, 1991, to be encompassed here).

In order to achieve a particularly high profitability (above 56.0% extraction), a three-stage procedure, i.e. incorporating a tertiary extraction, is necessary. The entire tertiary extract is subjected to the $CO_2$ extraction, because the tertiary extract contains off-flavour substances.

The advantage of the compressed gaseous $CO_2$ as extraction agent lies in regulating the selectivity of the extraction agent by varying the pressure conditions. Thus, up to approximately 100 bar the highly volatile substances, and at approximately 100 bar to 300 bar the less volatile substances from the secondary extract or tertiary extract, are extracted.

The extraction units are connected in series within the extraction plant and can be operated under process conditions which are independent of one another, only the cycle time being the same for all extraction units. The leached-Out percolator is emptied, rinsed and filled with freshly ground roast coffee. In the next cycle this percolator is stripped. After the stripping cycle, the percolator is taken over as drawing-off percolator into the primary extract unit. After drawing-off, the percolator moves cycle by cycle to the extraction water inlet of the primary extract unit. In the next cycle the percolator is taken over into the secondary extract unit and here is isolated for one cycle and brought to the new, higher temperature profile by the jacket steam heating. In the following cycle it is the drawing-off percolator of the secondary extract unit. After the secondary extract drawing, the percolator moves cycle by cycle to the extraction water inlet of the secondary extract unit. If a high profitability of over 50% extraction is required, as already mentioned above, the tertiary stage is connected downstream as third extraction unit. With the next cycle, the percolator is connected from the secondary extract unit into the tertiary extract unit, likewise isolated here for one cycle length and raised by jacket steam heating to the temperature level, which has Once again been increased. The tertiary extract drawing takes place in the following cycle. Afterwards, the percolator moves cycle by cycle to the extraction water entry of the tertiary stage. After this cycle, the percolator is disconnected from the process and emptied by pressure-relief, subsequently rinsed and then filled with freshly ground coffee. There follows the aroma stripping and then once again the extraction procedure described above.

Thanks to, this procedure and the fine grinding used of the roast coffee from with 100% < 1.8 mm mesh width, it is possible to regulate exactly the extraction process in the extraction units and with cycle times of 2 to 40 minutes per percolator, to carry out an extremely gentle extraction of the aroma-carrying fractions, because with the fine-grinding employed, operations can be carried out with very short residence times and low temperatures.

After concentrating the individual extracts and bringing them together with the drawn-off aroma condensates, a concentrate is obtained which Provides, both with the freeze-drying and with the spray-drying process, a soluble coffee powder which surprisingly is distinguishable only with difficulty from a freshly-brewed roast coffee infusion in terms of sensory perception. Instant coffee-typical characters, usually described as "malty", "yeasty", no longer occur, nor is a hydrolysis taste detectable.

A soluble coffee prepared according to the process subject of the invention was rated by an expert panel made up of 13 very well trained test persons. They were unable to ascertain any instant-typical or other off-flavour characters. According to the view of the test persons, the soluble coffee displays a roast bean coffee quality and with regard to its aroma, compares very favourably with the aroma impression Of the starting roast coffee.

Market research tests have shown that many test persons cannot differentiate between the soluble coffee and roast coffee. In blind tastings, roast coffee and soluble coffee prepared according to the process subject of the invention were rated by test persons who were not aware whether it was a roast coffee or an instant coffee. Those questioned were unable to ascertain any significant difference between roast coffee and instant coffee.

From the descriptions and profiles it transpired that the instant coffee lacked the typical "instant flavour". The scaled appraisal gave a virtually identical rating for instant coffee and roast coffee. The extent of the similarity of the instant coffee to roast coffee was further shown in the fact that barely half of those questioned thought the tested coffee was an instant coffee.

The process according to the invention is described in more detail below with reference to a detailed description of the Process conditions within the individual process steps.

a) Striping

Obtaining the highly volatile roast coffee aromas by stripping the finely-ground, pre-moistened roast coffee.

The percolator is emptied by pressure-relief and rinsed with fresh water, the walls of the percolator being cooled to approximately 40° C. to 80° C.

After the rinsing process, the percolator is filled with fresh finely ground roast coffee with a particle size of 100% < 1.8 mm mesh width and the roast coffee moistened with extraction water of a temperature of 30° C. to 100° C., preferably 75° C. to 95° C., to a water content of 4% to 70%, preferably 25 to 50%. To do this the extraction water is introduced into the percolator from below. After approximately 30 to 180 seconds the roast coffee has completely absorbed the water.

After the residence time of 30 to 180 seconds has expired, the draw-off pipe for the roast coffee aromas is cleared for the roast coffee aromas and the percolator set to the desired process pressure of 10 mbar abs to 1000 mbar abs, preferably 50 to 200 mbar. For stripping the roast coffee aromas, saturated steam Of 0.1 to 1.0 bar is introduced from below into the percolator which is under process pressure; it flows through the roast coffee bed which has developed in the percolator for a period of 2 minutes to 40 minutes, preferably 2 to 10 minutes; during this time the typical highly-volatile roast coffee aromas are removed from the roast coffee.

The saturated steam with the highly-volatile roast coffee aromas is subsequently introduced via a multi-stage cooler, the condensable aromas being liquefied at a temperature of 0° to 15° C., preferably 1° to 12° C., until the aroma condensate accounts for approximately 3 to 20 wt-% of the roast coffee used. The stripped aroma condensate (aroma "a") is placed in interim storage in a cooled container before being added to the concentrated extract. The non-condensable gases are removed via a vacuum pump.

b) Primary extraction

The primary extract is the extract which is removed from the percolator which has just been stripped and newly connected into the primary extract unit.

In the primary extraction stage, the roast coffee stripped by means of saturated steam in stage a) is extracted with extraction water.

The temperature pattern is so chosen that in this extraction unit only the quality-determining coffee constituents are extracted at a temperature of approximately 20° to 150° C., Preferably 90° to 140° C., and with a cycle time of approximately 2 to 40 minutes, preferably 5 to 12 minutes, i.e. an overall time of 10 to 200 minutes, under a pressure of 5 to 100 bar, preferably 35 to 60 bar.

The primary extract is removed from the drawing-off percolator of this extraction unit, the extraction being approximately 25 to 30%, preferably 28 to 32%, with a drawing-off ratio of roast coffee input to extraction quantity of 1:2 to 1:6, preferably 1:3 to 1:5.

In order to additionally obtain important aromas which are necessary to give the full roast coffee taste in the end-product, this high-quality primary extract containing no off-flavours is fed directly from the drawing-off percolator via a heat-exchanger, raised there to a temperature of 40° to 100° C., preferably 55° to 75° C., and pressure-relieved from the process pressure of the primary extract unit, i.e. 5 to 100 bar, preferably 35 to 60 bar, in a separator with a pressure level of 10 mbar abs to 1000 mbar abs, preferably 50 to 300 mbar abs. Lowering the pressure leads to spontaneous partial evaporation. The thus-released steam portion with the highly-volatile aromas is introduced via a two-stage cooler and condensed at a temperature of 0° to 15° C., preferably 1° to 12° C., to form aroma "b". The quantity of aroma condensate is 3 to 20%, preferably 4 to 11%, relative to the amount of roast coffee used. The aroma condensate "b" is placed in interim storage, cooled, before being added to the concentrated extract. The non-evaporated portion is obtained as primary extract and placed in interim storage until further Processing at a temperature of 6° to 20° C., preferably 8° to 12° C.

c) Secondary extraction

The secondary extraction is the extraction of the partially leached-out coffee obtained after stage b) with extraction water at a higher temperature than in stage b).

The secondary extraction takes place with extraction water of a temperature of approximately 100° to 215° C., preferably 170° to 195° C., at a pressure of 5 to 100 bar, preferably 35 to 60 bar, and with the same cycle time as in stage b) of 2 to 40 minutes, preferably 5 to 12 minutes, i.e. an overall time of 10 to 200 minutes. The secondary extract is drawn off from the last percolator of the extraction unit and immediately thereafter subjected to a treatment for removing or reducing negative taste substances. For this the secondary extract is passed to a pressure-relief stage under a pressure of 5 to 100 bar, preferably 35 to 60 bar, and at a temperature of 100° to 215° C., preferably 150° to 195° C. Lowering the pressure to 10 mbar abs to 2 bar abs, preferably 100 to 600 mbar abs, leads to partial evaporation, the evaporated portion being 2 to 25%, preferably 5 to 15% o the extract drawn off. This evaporated portion already contains unexpectedly many off-flavours which are removed from the extract in this way. This evaporated portion which is rich in off-flavours is discarded.

The non-evaporated portion remains as "secondary extract" and, unlike the conventional plants, no longer contains any instant-typical taste characters.

The extraction of the secondary extract unit is 10 to 27%, preferably 13 to 18%, with a draw-off ratio of 1;2 to 1:6, preferably 1:3 to 1:5, relative to the roast coffee input. Directly after pressure-relief, the non-evaporated portion of the secondary extract is cooled to 6° to 20° C., preferably 8° to 12° C.

According to another preferred embodiment, with which an extraction of 25 to 27% is realized with a draw-off ratio of 1:3 to 1:5, relative to the roast coffee input, the extraction takes place at a temperature of 195° to 215° C.

With this embodiment, off-flavour substances still remain in the non-evaporated portion of the secondary extract after the partial evaporation. In order to remove these off-flavour substances, the non-evaporated portion of the secondary extract is split while the partial evaporation is in progress into a first portion, preferably comprising approximately 70% and not containing any instant-typical taste characters and into a second portion which comprises the remaining approximately 30%. Off-flavour substances are removed with liquid or supercritical $CO_2$ from the second portion of the secondary extract in a stage e).

In order to further increase profitability, a tertiary extraction can follow the secondary extraction.

d) Tertiary extraction

The tertiary extraction is the extraction of the partially leached-out roast coffee obtained in stage c) with extraction water of a higher temperature than in stage c).

The third extraction unit (tertiary extraction) serves to increase the profitability of the overall process. It is operated with extraction water of a temperature of approximately 150° to 240° C., preferably 195° to 230° C., at a pressure of 5 to 100 bar, preferably 35 to 60 bar, and with a cycle time of 2 to 40 minutes, preferably 5 to 12 minutes, i.e. an overall time of 8 to 160 minutes The tertiary extract is removed from the last percolator of the tertiary extraction stage and subjected to a treatment for removing undesired off-flavour substances. For this the tertiary extract with a temperature of 150° to 240° C., preferably 180° to 225° C., is conducted to a pressure-relief stage directly after the drawing-off. Lowering the pressure of 5 to 100 bar, preferably 35 to 55 bar, to 10 mbar abs to 5 bar, preferably 800 to 1200 mbar abs, leads to partial evaporation. The evaporated portion is 2 to 25%, preferably 5 to 15%, of the tertiary extract drawn off and contains to a large degree the off-flavours occurring in the tertiary extract stage. The evaporated and subsequently condensed portion is removed from the process and discarded.

The non-evaporated portion remains as "tertiary extract" and is cooled to 20° C. directly after the pressure-relief. In this extraction unit an extraction of 5 to 15%, preferably 10 to 15%, is achieved with a draw-off ratio of 1:2 to 1:6, preferably 1:3 to 1:5, relative to the roast coffee input.

Off-flavour substances which were not removed by partial evaporation are also removed from the non-evaporated portion of the tertiary extract in a stage e) by an extraction with liquid or supercritical $CO_2$.

e) Extraction of off-flavour with liquid or supercritical $CO_2$

In order to further remove the substances responsible for off-flavour, depending on the embodiment, the second portion of the secondary extract from stage c) can be extracted either alone or together with the tertiary extract from stage d) in a high-pressure extraction plant with liquid or supercritical $CO_2$.

The extraction is carried out in an extraction column in counter-flow. The extract is introduced in the upper region of the column and removed in the lower column region. Liquid or supercritical $CO_2$ is passed as extraction agent in counter-flow. Through suitable internals (Sulzer packing) an intensive exchange between the extraction agent $CO_2$ and the extract is achieved.

The extraction of the liquid extract with liquid or supercritical $CO_2$ is carried out at a pressure of 60 to 400 bar, preferably 80 to 160 bar, and a temperature of 20° to 120° C., preferably 60° to 90° C.

The off-flavour substances can be separated from the $CO_2$ by lowering the pressure to 20 to 200 bar in a separator designed for the purpose or by adsorption onto suitable adsorbents, such as, e.g., ion-exchangers, activated carbon or molecular sieves.

1 to 15% off-flavour substances, relative to the extract quantity used, are extracted and discarded. After this treatment, the raffinate obtained was virtually completely free from the off-flavours. Supercritical $CO_2$ proved itself to be an unexpectedly good selective solvent for the off-flavour substances.

f) After the treatment of the second portion of the secondary extract and of the tertiary extract with $CO_2$, they are evaporated mixed together in a multi-stage evaporator to 40 to 60%, preferably 45 to 50% solids concentration and cooled to 6° to 20° C., preferably 8° to 12° C.

Parallel to this, the qualitatively high-value primary extract is very carefully concentrated in a multi-stage evaporator to 25 to 40%, preferably 30 to 35% solids concentration and likewise cooled to 6° to 20° C., preferably 8° to 12° C.

Also parallel to this, the secondary extract or optionally only the first portion of the secondary extract is carefully concentrated in a multi-stage evaporator to 40 to 60%, preferably to 45 to 50 solids concentration.

The extract solutions are mixed and combined with the aromas from roast coffee and primary extract, which have been stored at 1° to 20° C., preferably 1° to 12° C. The finished extract has a solids concentration of 35 to 55%, is stored at 6° to 20° C. and freeze- or spray-dried within 15 hours.

EMBODIMENT 1

Example 1 describes the process of the two-stage extraction to obtain a profitability of up to about 50% extraction.

The process steps described below run simultaneously within a cycle of 8 minutes.

The just emptied percolator, prepared for loading, with a diameter d=400 mm and a length/diameter ratio of 2.5, is filled with 30 kg of ground roast coffee with a grain spectrum of 100%<1.8 mm, including 20%<0.5 mm mesh width, for the obtaining of aroma and subsequent extraction. The walls of the percolator are cooled to 65° C. The roast coffee is moistened with water at 82° C. in 70 seconds to a water content of 45%. There follows a residence time of 90 seconds before the percolator is evacuated to the process pressure of 100 mbar abs. Saturated steam of 0.1 bar is introduced from below into the percolator, flows through the roast coffee and exits at the top.

Cooling takes place in a two-stage cooler, cooled in the first stage to 12° C. and in the second to 2° C. aroma condensate temperature. Until further processing, the aroma condensate ("a") is stored for 4 hours maximum at 2° C.

12.5% aroma condensate (kg), relative to the roast coffee poured in (kg), is stripped off in 300 seconds.

In the primary extraction stage, the percolator stripped in the previous cycle is extracted and the extract drawn off.

The primary extraction unit comprises 7 percolators connected in series and is operated at a pressure of 45 bar. From the extraction water inlet to the extract drawing-off percolator, the flow-through percolators is in each case from below upwards. The inlet temperature of the extract into the drawing-off percolator is kept constant at 92° C. via a heat-exchanger.

The temperature profile is set via the double-jacket heating of the percolators and is:

| 1st | Percolator extraction water inlet: | 144° C. |
|---|---|---|
| 2nd | Percolator inlet | 140° C. |
| 3rd | Percolator inlet | 135° C. |
| 4th | Percolator inlet | 122° C. |
| 5th | Percolator inlet | 112° C. |
| 6th | Percolator inlet | 105° C. |
| 7th | Percolator inlet primary extract drawing-off | 92° C. |

The extract amount drawn off per cycle (kg) is 3.2 times the amount of roast coffee used (kg).

The average solids concentration of 9.7% results in the primary extraction unit, in an extraction of 31.0%, relative to roast coffee. The primary extract is directly, coming from the drawing-off, reduced by a pressure-maintaining device, from the system pressure of 45 bar to a pressure of 5 bar, raised via a heat-exchanger to a temperature of 68° C. and spontaneously pressure-relieved in a separator at a pressure of 150 mbar abs. The released amount of steam, enriched with aroma substances, is condensed in a two-stage cooler at 12° C. and 2° C. as aroma "b" and stored at 2° C. until further use.

The aroma condensate amount (kg) is 12.0% of the amount of roast coffee used per cycle (kg).

The two aroma condensates, aroma "a", obtained from roast coffee and aroma "b", from the primary extract, are added to the concentrated extract before drying.

The non-evaporated portion Of the primary extract is cooled to 8° C., very carefully concentrated in a multi-stage evaporator to a solids concentration of 42% and stored at 8° C.

The secondary extraction unit comprises 7 percolators, 6 of which are connected in series, are flowed through and undergo drawing-off of the secondary extract. In this cycle the seventh percolator was connected from the primary stage into the secondary stage, where it was isolated and raised, by jacket steam heating, to the temperature level of the secondary extraction unit.

The secondary extraction unit is operated at a pressure of 50 bar and a temperature of 181° C. which is uniform for all percolators. The quantity of secondary extract drawn off (kg) is 3.1 times the amount of roast coffee used (kg), the average solids concentration in the drawn-off extract 5.2%. An extraction of 16.0%, relative to the amount of roast coffee used, is achieved.

The secondary extract drawn off is continuously pressure-relieved in two steps in a separator. In the first stage, from 50 bar to 6 bar, and in the second stage from 6 bar to 600 mbar abs.

The released steam portion of 40% of the roast coffee used is highly enriched with off-flavour components and is liquefied at 76° C. in the condenser and drawn off continuously from the process.

Downstream from the separator, the secondary extract is cooled to 8° C. and concentrated in a multi-stage evaporator to 50% solids concentration and stored at 8° C.

The primary extract and the secondary extract together give an overall extraction of 47.0%, relative to roast coffee. They are mixed with each other and reacted with the proportional amounts of aroma "a"=200 g/1000 g dry substance and aroma "b"=195 g/1000 g dry substance. The solids concentration of the thus prepared extract is 37.5%.

The thus concentrated and aromatized coffee extract has a solids concentration of 37.5% and is processed on conventional freeze- or spray-driers.

EMBODIMENT 2

The steam stripping of the ground roast coffee is carried out as described in Example 1.

In the primary extraction stage, the percolator stripped in the previous cycle is extracted and the extract removed.

The primary extraction unit comprises 7 percolators connected in series and is Operated at a pressure of 45 bar. From the extraction water inlet to the extract drawing-off percolator, the flow through the percolators is in each case from below upwards. The inlet temperature of the extract into the drawing-off percolator is kept constant at 92° C. via a heat-exchanger.

The temperature profile is set via the double-jacket heating of the percolators and is:

| 1st | Percolator extraction water inlet: | 144° C. |
|---|---|---|
| 2nd | Percolator inlet | 140° C. |
| 3rd | Percolator inlet | 135° C. |
| 4th | Percolator inlet | 122° C. |
| 5th | Percolator inlet | 112° C. |
| 6th | Percolator inlet | 105° C. |
| 7th | Percolator inlet primary extract drawing-off | 92° C. |

The extract amount drawn off per cycle (kg) is 3.2 times the amount of roast coffee used (kg).

The average solids concentration of 9.7% results, in the Primary extraction unit, in an extraction of 31.0%, relative to roast coffee. The Primary extract is directly, coming from the drawing-off, reduced by a pressure-maintaining device, from the system pressure of 45 bar to a pressure of 5 bar, raised via a heat-exchanger to a temperature of 68° C. and spontaneously pressure-relieved in a separator at a pressure of 150 mbar abs. The released amount of steam, enriched with aroma substances, is condensed in a two-stage cooler at 12° C. and 2° C. as aroma "b" and stored at 2° C. until further use.

The aroma condensate amount (kg) is 12.0% of the amount of roast coffee used per cycle (kg).

The two aroma condensates, aroma "a", obtained from roast coffee and aroma "b", from the primary extract, are added to the concentrated extract before drying.

The non-evaporated portion of the primary extract is cooled to 8° C., very carefully concentrated in a multi-stage evaporator to a solids concentration of 40.2% and stored at 8° C.

The secondary extraction unit comprises 7 percolators, 6 of which are connected in series, are flowed through and undergo drawing-off of the secondary extract. In this cycle the seventh percolator was connected from the primary stage into the secondary stage, where it was isolated and raised, by jacket steam heating, to the temperature level of the secondary extraction unit.

The secondary extraction unit is operated at a pressure of 50 bar and a temperature of 200° C. which is uniform for all percolators. The quantity of secondary extract drawn off (kg) is 3.5 times the amount of roast coffee used (kg), the average solids concentration in the drawn off extract 5.0%. An extraction of 25.0%, relative to the amount of roast coffee used, is achieved.

The secondary extract drawn off is continuously pressure-relieved in two steps in a separator. In the first stage, from 50 bar to 6 bar, and in the second stage from 6 bar to 600 mbar abs.

The released steam portion of 35% of the roast coffee used is highly enriched with off-flavour components and is liquefied in the condenser at 76° C. and continuously removed from the process. The secondary extract is cooled to 8° C. downstream from the separator and split into two parts. The first part is 70%, and the second part 30%, of the secondary extract drawn off.

The first part (70%) is concentrated on a multi-stage evaporator in a known manner to a solids concentration of 48% and stored at 8° C. The second part (30%) undergoes a $CO_2$ treatment to remove off-flavour components.

For this the second portion of the secondary extract is extracted in a $CO_2$ pressure extraction column (Sulzer 13 BX packing) with a diameter d=300 mm and a length/diameter ratio of 20:1 in counter-flow with $CO_2$ as extraction agent at a temperature of 70° C. and a pressure of 120 bar.

The off-flavour extract is separated from the $CO_2$ by pressure-relief to 50 bar. The portion of extracted substances, relative to the extract quantity used, is 5%.

The thus treated extract is concentrated on a multi-stage evaporator in a known manner to a solids concentration of 48% and cooled to 8° C. The now present extracts, which together give an extraction of 56.0%, relative to roast coffee, are mixed with each other and combined with the proportional amounts of aroma "a"=200 g/1000 g dry substance and aroma "b"=195 g/1000 g dry substance.

The thus concentrated and aromatized coffee extract has a solids concentration of 37.5% and is processed on conventional freeze- or spray-driers.

EMBODIMENT 3

The process steps described below run simultaneously within a cycle of 8 minutes.

The just emptied percolator (P16), prepared for loading, with a diameter d=400 mm and a length/diameter ratio of 2.5, is filled with 30 kg of ground roast coffee with a grain spectrum of 100%<1.8 mm, including 20%<0.5 mm mesh width, for the obtaining of aroma and subsequent extraction. The walls of the percolator are cooled to 65° C. The roast coffee is moistened with water at 82° C. in 70 seconds to a water content of 45%. There follows a residence time of 90 seconds before the percolator is evacuated to the process pressure of 100 mbar abs. Saturated steam of 0.1 bar is introduced from below into the percolator, flows through the roast coffee and exits at the top.

Cooling takes place in a two-stage cooler, cooled in the first stage to 12° C. and in the second to 2° C. aroma condensate temperature. Until further processing, the aroma condensate ("a") is stored for 4 hours maximum at 2° C. 12.5% aroma condensate (kg), relative to the roast coffee poured in (kg), is stripped off in 300 seconds.

In the primary extraction stage, the percolator stripped in the previous cycle is extracted and the extract drawn off.

The primary extraction unit comprises 5 percolators (P6 to P2) connected in series and is operated at a pressure of 45 bar. From the extraction water inlet (P6) to the extract drawing-off percolator (P2), the flow through the percolators is in each case from below upwards. The inlet temperature of the extract into the drawing-off percolator is kept constant at 92° C. via a heat-exchanger.

The temperature profile is set via the double-jacket heating of the percolators and is:

| 1st | Percolator extraction water inlet: | 148° C. |
|---|---|---|
| 2nd | Percolator inlet | 135° C. |
| 3rd | Percolator inlet | 120° C. |
| 4th | Percolator inlet | 112° C. |
| 5th | Percolator inlet primary extract drawing-off | 92° C. |

The extract amount drawn off per cycle (kg) is 3.7 times the amount of roast coffee used (kg).

The average solids concentration of 8.5% results, in the primary extraction unit, in an extraction of 31.5%, relative to roast coffee. The primary extract is directly, coming from the drawing-off, reduced by a pressure-maintaining device from the system pressure of 45 bar to a pressure of 5 bar, raised via a heat-exchanger to a temperature of 68° C. and spontaneously pressure-relieved in a separator at a pressure of 150 mbar abs. The released amount of steam, enriched with aroma substances, is condensed in a two-stage cooler at 12° C. and 2° C. as aroma "b" and stored until further use at 2° C.

The aroma condensate amount (kg) is 12.0% of the amount of roast coffee used per cycle (kg).

The two aroma condensates, aroma "a", obtained from roast coffee and aroma "b", from the primary extract, are added to the concentrated extract before drying.

The non-evaporated portion of the primary extract is cooled to 8° C., very carefully concentrated in a multistage evaporator to a solids concentration of 37.5% and stored at 8° C.

The secondary extraction unit comprises 5 percolators (P11 to P8), 4 of which (P11 to P8) are connected in series, are flowed through and undergo drawing-off of the secondary extract (P8). In this cycle the fifth percolator (P7) was connected from the primary stage into the secondary stage, where it was isolated and raised, by jacket steam heating, to the temperature level of the secondary extraction unit.

The secondary extraction unit is operated at a pressure of 50 bar and a temperature of 200° C. which is uniform for all percolators. The quantity of secondary extract drawn off (kg) is 3.5 times the amount of roast coffee used (kg), the average solids concentration in the extract drawn off 5.0%. An extraction of 25.0%, relative to the amount of roast coffee used, is achieved.

The secondary extract drawn off is continuously pressure-relieved in two steps in a separator. In the first stage, from 50 bar to 6 bar, and in the second stage from 6 bar to 600 mbar abs.

The released steam portion of 35% of the roast coffee used is highly enriched with off-flavour components and is liquefied at 76° C. in the condenser and drawn off continuously from the process.

Downstream from the separator, the secondary extract is cooled to 8° C. and split into two parts. The first part is 70%, and the second part 30%, of the secondary extract drawn off.

The first part (70%) is concentrated on a multi-stage evaporator in a known manner to a solids concentration of 48% and stored at 8° C. The second part (30%) is conducted with the tertiary extract to a $CO_2$ treatment to remove off-flavour components. The tertiary extraction unit comprises 4 percolators (P15 to P12), of which 3 percolators (P15 to P13) are connected in series, are flowed through and undergo drawing-off of the tertiary extract (P13). In this cycle the fourth percolator (P12) was connected from the secondary unit into the tertiary unit, where it was isolated and raised to the temperature level of the tertiary extraction unit. The tertiary extraction unit is operated at a pressure of 55 bar and a temperature of 228° C. The quantity of tertiary extract drawn off (kg) is 3.9 times the amount of roast coffee used and has an average solids concentration of 2.6%. An extraction of 10%, relative to roast coffee, results. The tertiary extract drawn off is pressure-relieved in two steps in a separator.

| 1st stage | 55 bar to 8 bar |
|---|---|
| 2nd stage | 8 bar to 1 bar. |

The steam portion from the tertiary extract released by exploiting enthalpy is 35% of the amount of roast coffee used and is liquefied at 80° C. and drawn off continuously from the process.

The tertiary extract is cooled to 20° C. and extracted together with the 30% portion of the secondary extract in a $CO_2$ pressure-extraction column (Sulzer 13 BX packing) with a diameter d=300 mm and a length-/diameter ratio of 20:1 in counter-flow with $CO_2$ as extraction agent at a temperature of 70° C. and a pressure of 120 bar. The off-flavour extract is separated from the $CO_2$ by pressure-relief to 50 bar. The portion of extracted substances, relative to the amount of extract used, is 5%.

The thus-treated extract is concentrated on a multi-stage evaporator in a known manner to a solids concentration of 48% and cooled to 8° C. The now present extracts, which together give an extraction of 66.5%, relative to roast coffee, are mixed with each other and combined with the proportional amounts of aroma "a"=200 g/1000 g dry substance and aroma "b"=195 g/1000 g dry substance.

The thus-concentrated and aromatized coffee extract has a solids concentration of 37.5% and is processed on conventional freeze- or spray-driers.

We claim:

1. A process for multi-stage extraction of ground roast coffee in which a soluble coffee is provided in an economically acceptable yield, having the original aroma of the starting roast coffee, and wherein off-flavours arising from the hydrolysis process are not longer present thus giving the soluble coffee a roast bean coffee quality which comprises the following stages:
- (a) ground roast coffee of a particle size of at most approximately 1.8 mm, which has been moistened to a water content of approximately 4 to 70 wt %, relative to the ground dry roast coffee, is treated in a percolator with a length/diameter ratio of approximately 3.2:1 to 0.9:1 with saturated steam at a pressure of approximately 0.1 to 1 bar and a temperature of approximately 30° to 100° C. for approximately 2 to 40 minutes, the steam loaded with coffee constituents is condensed at a temperature of approximately 0° to 15° C. to a condensate quantity of approximately 3 to 20 wt %, relative to the quantity of dry roast coffee used, and the condensate is obtained as aroma "a",
- (b) the coffee remaining from stage (a), freed from aroma "a", is subjected with extraction water to a primary extraction in a quantity of approximately 2 to 6 parts by weight per part by weight of dry starting roast coffee, at a temperature of approximately 20° to 150° C. and a pressure of approximately 5 to 100 bar with the aid of at least 2 percolators with a length/diameter ratio of approximately 3.2:1 to 0.9:1 for approximately 2 to 40 minutes per percolator and for an overall time of approximately 10 to 200 minutes, followed by pressure-relief to approximately 0.001 to 1 bar, the evaporated portion obtained by spontaneous partial evaporation of the extract is condensed at a temperature of approximately 0° to 15° C. and the condensate is obtained as aroma "b" and the non-evaporated portion as primary extract;
- (c) the coffee remaining from stage (b), freed from aroma "b" and from primary extract, is subjected with extraction water to a secondary extraction in a quantity of approximately 2 to 6 parts by weight per part by weight of dry starting roast coffee at a higher temperature than in stage (b) within a range of approximately 100° to 215° C. and at a pressure of approximately 5 to 100 bar with the aid of at least 2 percolators with a length/diameter ratio of approximately 3.2:1 to 0.9:1 for approximately 2 to 40 minutes per percolator and for an overall time of approximately 10 to 200 minutes, followed by pressure-relief to approximately 0.01 to 2 bar, the evaporated portion obtained by spontaneous partial evaporation of the extract is discarded, the non-evaporated portion is obtained as secondary extract; and
- (d) the extracts are concentrated, combined, mixed with aromas "a" and "b", and the obtained extract which has a concentration of about 35 to 55% is dried.

2. The process of claim 1 wherein the coffee remaining from stage (c), freed from the discarded evaporated portion and from the secondary extract, is subjected with extract water to a tertiary extraction in a quantity of approximately 2 to 6 parts by a weight per part by weight of dry starting roast coffee at a higher temperature than in stage (c) within a range of approximately 150° to 240° C. and at a pressure of approximately 5 to 100 bar with the aid of at least 2 percolators with a length/diameter ratio of approximately 3.2:1 to 0.9:1 for approximately 2 to 40 minutes per percolator and for an overall time of approximately 8 to 160 minutes, followed by pressure-relief to approximately 0.01 to 5 bar, the evaporated portion obtained by spontaneous partial evaporation of the extract is discarded and the non-evaporated portion is obtained as tertiary extract.

3. The process of claim 2 wherein the secondary extracted is divided into a first portion of about 70% and a second portion of about 30%, the second portion of the secondary extract and the tertiary extract are combined, and then extracted, with liquid or supercritical $CO_2$ at a temperature of approximately 20° to 120° C. and a pressure of approximately 60 to 400 bar to thereby remove off-flavors present in the combined extracts.

4. The process of claim 3 wherein the combined extracts are concentrated in a multi-stage evaporator to a solids concentration of approximately 40 to 60%.

5. The process of claim 4 wherein the primary extract is concentrated in a multi-stage evaporator to a solids concentration of approximately 25 to 40%, and wherein the first portion of the secondary extract is concentrated in a multi-stage evaporator to a solids concentration of approximately 40 to 60%.

6. The process of claim 5 wherein the primary, secondary, and tertiary extractions are preferably carried out at a drawing-off ratio of roast coffee input to extraction quantity of 1:2 to 1:6, the cycle time in the individual extraction stages (b), (c), and (d) is preferably 5 to 12 minutes, and the pressure in the individual extractions stages (b), (c), and (d) is 35 to 60 bar.

7. The process of claim 6 wherein in stage (a) only one percolator is used, and in each of stages (b), (c), and (d) at least 2 percolators are used, said percolators having a length/diameter ratio of 3:1 to 2:1.

8. The process of claim 7 wherein the percolators have a length/diameter ratio of 2.5:1 and 4 to 7 percolators are used in stages (b), (c), and (d).

9. The process of claim 8 wherein the process is carried out semi-continuously in a circular arrangement of 7 to 22 percolators in the three extraction stages, only one percolator being provided for stripping stage (a) and at least 2 percolators for each of the three extraction stages, said percolators in contact with each other within each individual stage so that the outlet of each percolator is joined to the inlet of the following percolator and the fresh extraction water being introduced into the last percolator in each case with the relatively largely extracted coffee of the secondary and tertiary extractions being drawn off from the first percolator in each case with slightly extracted coffee and the plant being operated with cycle times which are identical for all percolators, so that in each cycle time a percolator preceding the stripping percolator of stage (a) is filled with fresh, ground roast coffee and the last percolator of the tertiary extraction is emptied of completely extracted coffee, whereby each extraction always move on one percolator at a time towards the newly poured, fresh roast coffee.

* * * * *